United States Patent
Nguyen et al.

(10) Patent No.: US 7,222,636 B2
(45) Date of Patent: May 29, 2007

(54) ELECTRONICALLY ACTUATED VALVE

(75) Inventors: Anh N. Nguyen, Milpitas, CA (US);
Joseph Yudovsky, Campbell, CA (US);
Mark A. Alexander, Boulder Creek, CA (US); Hungsuk A. Yoon, San Jose, CA (US); Chiliang L. Chen, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/644,598

(22) Filed: Aug. 20, 2003

(65) Prior Publication Data
US 2005/0229969 A1 Oct. 20, 2005

Related U.S. Application Data

(60) Provisional application No. 60/405,070, filed on Aug. 20, 2002.

(51) Int. Cl.
*F16K 31/06* (2006.01)
(52) U.S. Cl. ............... 137/15.04; 137/240; 251/129.17
(58) Field of Classification Search ........... 251/129.15, 251/129.02, 129.17, 331; 137/240
See application file for complete search history.

(56) References Cited

U.S. PATENT DOCUMENTS

| | | | |
|---|---|---|---|
| 3,921,111 A * | 11/1975 | Kowalski | 251/129.15 |
| 4,558,845 A * | 12/1985 | Hunkapiller | 251/331 |
| 5,295,662 A * | 3/1994 | Yamaji et al. | 251/331 |
| 5,850,853 A | 12/1998 | Ohmi et al. | 137/606 |
| 5,881,997 A | 3/1999 | Ogawa et al. | 251/335.2 |
| 5,899,437 A | 5/1999 | Quarre | 251/129.2 |
| 6,152,168 A | 11/2000 | Ohmi et al. | 137/487.5 |
| 6,193,212 B1 | 2/2001 | Ohmi et al. | 251/129.16 |
| 6,210,482 B1 | 4/2001 | Kitayama et al. | 118/715 |
| 6,218,301 B1 | 4/2001 | Yoon et al. | 438/685 |
| 6,289,923 B1 * | 9/2001 | Ohmi et al. | 137/486 |
| 6,360,762 B2 | 3/2002 | Kitayama et al. | 137/1 |
| 6,394,415 B1 | 5/2002 | Ohmi et al. | 251/129.16 |
| 6,615,871 B2 | 9/2003 | Ohmi et al. | 137/884 |
| 2004/0011404 A1* | 1/2004 | Ku et al. | 137/341 |

OTHER PUBLICATIONS

Fine Ceramic Mini-Control Valves, 12 pgs.
Fujikin of America, New Products: W-Seal, dated Nov. 11, 2003, 2 pgs.

(Continued)

*Primary Examiner*—Kevin Lee
(74) *Attorney, Agent, or Firm*—Patterson & Sheridan, LL (57) ABSTRACT

The present invention relates to a method and apparatus for delivery of reactants to a substrate processing chamber. An electronically controlled valve assembly is provided for rapid delivery of pulses of reactants to the chamber. The valve assembly comprises a valve body having a valve seat, and at least one gas inlet and one gas outlet below the seat. The piston is selectively movable within the valve body to open and close the valve. In order to actuate the valve assembly, current is sent to a solenoid coil within the valve body. The solenoid coil generates a magnetic field that acts on an adjacent magnetic member. The solenoid coil, magnetic member and piston are arranged such that relative movement of the coil and magnetic member cause the piston to be moved relative to the valve seat.

40 Claims, 4 Drawing Sheets

OTHER PUBLICATIONS

Fujikin of America, Electronic Valves, dated Nov. 11, 2003, 3 pgs.
Fujikin of America, Electronic Valves, dated Nov. 11, 2003, 2 pgs.

Fujikin of America, The Mini Control Valve, dated Nov. 11, 2003, 3 pgs.

* cited by examiner

ELECTRONICALLY ACTUATED VALVE

RELATED APPLICATIONS

This application claims benefit of U.S. Provisional Patent Application No. 60/405,070, filed Aug. 20, 2002. That application was entitled "Electronically Actuated Valve," and is incorporated herein by reference in its entirety.

BACKGROUND OF THE INVENTION

1. Field of the Invention

Embodiments of the present invention relate to a method and apparatus for delivery of one or more reactants to a substrate processing chamber. More particularly, embodiments of the present invention relate to a valve assembly for rapid delivery of pulses of one or more reactants to a substrate processing chamber.

2. Description of the Related Art

Reliably producing sub-micron and smaller features is one of the key technologies for the next generation of very large scale integration (VLSI) and ultra large scale integration (ULSI) of semiconductor devices. However, as the fringes of circuit technology are pressed, the shrinking dimensions of interconnects in VLSI and ULSI technology have placed additional demands on the processing capabilities. The multilevel interconnects that lie at the heart of this technology require precise processing of high aspect ratio features, such as vias and other interconnects. Reliable filling of the interconnects is important to VLSI and ULSI success and to the continued effort to increase circuit density and quality of individual substrates.

As circuit densities increase, the widths of vias, contacts, and other features, as well as the dielectric materials between them, decrease to sub-micron dimensions (e.g., less than 0.20 micrometers or less), whereas the thickness of the dielectric layers remains substantially constant, with the result that the aspect ratios for the features, i.e., their height divided by width, increase. Many traditional deposition processes have difficulty filling sub-micron structures where the aspect ratio exceeds 4:1, and particularly where the aspect ratio exceeds 10:1. Therefore, there is a need for technology that provides for the formation of substantially void-free and seam-free sub-micron features having high aspect ratios.

Atomic layer deposition is one deposition technique being explored for the deposition of material layers into high aspect ratio vias. An atomic layer deposition (ALD) process is a cyclical deposition method that is generally used for depositing ultra-thin layers (e.g., mono-layers) over features of semiconductor devices having a high aspect ratio.

One example of atomic layer deposition comprises the sequential introduction of pulses of gases. The ALD process utilizes a chemisorption phenomenon to deposit monolayers of reactive precursor molecules. During the ALD process, reactive precursors are injected, in the form of pulsed gases, into a deposition chamber in a predetermined cyclical order. Each injection of a precursor provides a new atomic layer on the substrate that is additive to or combines with the previously deposited layers. Injections of individual precursor gases generally are separated by injections of a purge gas. In some instances, the purge gas may be flown continuously into the deposition chamber. The purge gas generally comprises an inert gas, such as argon (Ar), helium (He) and the like, or a mixture thereof. During the ALD process, the deposition chamber is also continuously evacuated to reduce the gas phase reactions between the precursors.

By way of example, during an ALD operation a first cycle for the sequential introduction of pulses of gases may comprise a pulse of a first reactant gas, followed by a pulse of a purge gas and/or a pump evacuation, followed by a pulse of a second reactant gas, and followed by a pulse of a purge gas and/or a pump evacuation. The term "gas" as used herein is defined to include a single gas or a plurality of gases. Sequential introduction of separate pulses of the first reactant and the second reactant may result in the alternating self-limiting adsorption of monolayers of the reactants on the surface of the substrate, thus forming a thin layer of material for each cycle. The cycle may be repeated to a desired thickness of the deposited material.

Various problems exist with current gas delivery apparatuses used to perform atomic layer deposition. Examples include slow delivery of reactants, generation of particles, and/or failure over time of components of the gas delivery apparatuses. Therefore, there is a need for new apparatuses and methods to perform gas delivery, such as during an ALD procedure.

SUMMARY OF THE INVENTION

Embodiments of the present invention generally relate to a method and apparatus for delivery of one or more reactants to a substrate processing chamber. More particularly, embodiments of the present invention relate to a valve assembly for efficient delivery of pulses of one or more reactants to a substrate processing chamber.

The valve assembly of the present invention is electronically controlled. The valve assembly first comprises a valve body having a valve seat, and at least one gas inlet and one gas outlet below the seat. The piston is slidably movable within the valve body to open and close the valve. Preferably, a diaphragm is disposed at the end of the piston that is dimensioned to seal the flow of fluids through the valve body when the valve assembly is in its closed position, and to permit the flow of fluids through the valve body when the valve assembly is in its open position.

In order to actuate the valve assembly, current is sent to a solenoid coil within the valve body. The solenoid coil generates a magnetic field that acts on an adjacent magnetic member. When the coil is electromagnetically induced, the solenoid coil and the magnetic member move relatively away from each other. The solenoid coil, magnetic member and piston are arranged such that relative movement of the coil and magnetic member cause the piston to be moved relative to the valve seat.

The piston may be biased in an open position, such that actuation of the piston causes the valve assembly to be closed. However, it is preferred that the piston be biased in a closed position, such that actuation of the piston causes the valve assembly to be opened. In one embodiment, the valve assembly further includes a diaphragm position indicator so that the movement of the diaphragm at the end of the piston may be confirmed.

In operation according to one embodiment, a reactant gas source is placed in fluid communication with one inlet, and a purge gas source is placed in fluid communication with another inlet. The valve assembly is normally closed. When current is directed to the solenoid coil, a magnetic field is generated which causes the magnetic member to mechanically act upon the piston. The piston is moved, causing the attached diaphragm to move off of the seat. This, in turn, permits the reactant gas and the purge gas to enter a chamber in the valve body. The chamber is in fluid communication with the gas outlet. The gas outlet, in turn, is in fluid communication with a substrate processing chamber. In this manner, small quantities of gas may be selectively pulsed into a substrate processing chamber.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention relate to a valve assembly for delivery of one or more reactants to a substrate processing chamber. More particularly, embodiments of the present invention relate to a valve assembly for rapid delivery of pulses of one or more reactants to a substrate processing chamber. Reactants can be precursors, reducing agents, oxidizing agents, catalysts, and mixtures thereof.

Figure 1:
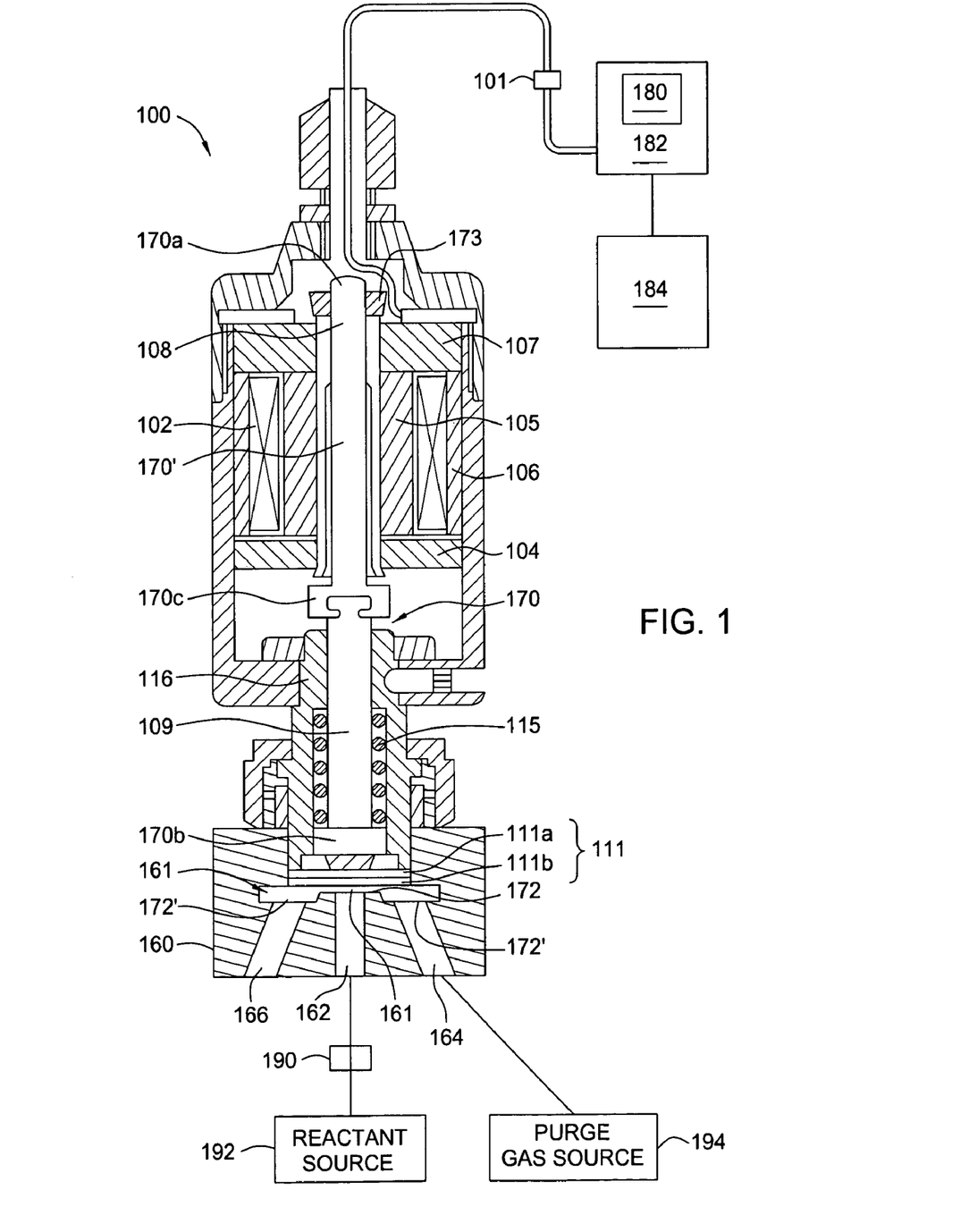
FIG. 1 is a cross-sectional view of an electronically controlled valve assembly of the present invention, in one embodiment. In this arrangement, the valve assembly includes a three-port valve body.

FIG. 1 is a cross-sectional view of an electronically controlled valve assembly 100 of the present invention, in one embodiment. The valve assembly 100 first comprises a valve port body 160. The valve port body includes a valve chamber 161 for receiving different fluids. In the arrangement shown in FIG. 1, the valve port body 160 defines a three-port valve body 160 for placing the valve chamber 161 in fluid communication with three fluid inlets, or "ports." The three ports are shown at 162, 164 and 166.

In the arrangement of FIG. 1, the first port 162 serves as a reactant inlet, the second port 164 serves as a purge inlet 164, and the third port serves as an outlet 166. The reactant inlet 162 is in fluid communication with a reactant source 192. The reactant inlet 162 receives a reactant from the reactant source 192 and delivers the reactant into the valve chamber 161. The purge inlet 164 is in fluid communication with a purge gas source 194. The purge inlet 164 receives a purge gas from the purge gas source 194 and delivers the purge gas into the valve chamber 161. In both instances, the gas, e.g., reactant or purge gas, is then expelled by the valve assembly 100 through the outlet 166 and into a substrate processing chamber body (not shown). If the substrate processing chamber includes two or more valve assemblies 100, the purge inlet 164 of each valve assembly 100 may be coupled to separate purge gas sources or may be coupled to a common purge gas source.

The valve body 160 includes a valve seat 172. The valve seat 172 is disposed in the valve chamber 161 at the interface with the three inlets 162, 164, 166. The valve seat 172 receives a valve member 170 that resides within the valve body 160. Movement of the valve member 170 onto and off of the seat 172 allows the valve assembly 100 to selectively receive gases into the valve chamber 161 through the reactant inlet 162 and the purge inlet 164, and to expel the reactant gases and purge gases through the outlet 166 and into the substrate processing chamber.

The valve member 170 first comprises a piston 170' movable within the valve chamber 161. The piston 170' is a longitudinal shaft that sealingly resides within the valve body 160 above the seat 172. The piston 170' has a proximal end 170a at a first end of the valve body 160, and a distal end 170b that terminates above the seat 172. In the arrangement of FIG. 1, the piston 170' is made of two separate bodies—a movable shaft 108, and a valve rod 109 connected to the movable shaft 108. However, it is understood that the piston 170' may be a unitary piece.

The valve member 170 of FIG. 1 next comprises a bonnet 116. The bonnet 116 defines a longitudinal housing for the valve rod 109. An upper portion of the bonnet 116 closely receives the rod 109, while a lower portion of the bonnet 116 has an enlarged inner diameter that forms an annular region around the rod 109. Within the annular region resides a spring 115. The spring 115 may be biased in either tension or compression, depending on the direction of desired bias for the piston 170'. Preferably, the spring 115 serves as a biasing member for urging the distal end 170b of the piston 170' downward onto the seat 172.

The distal end 170b of the piston 170' defines a diaphragm 111. The diaphragm 111 is preferably made of a nickel alloy, such as a nickel-cobalt alloy. Alternatively, the diaphragm 111 may be made of any suitable material. The diaphragm 111 is configured to close off the reactant inlet 162 and the purge inlet 164 when the valve assembly 100 is in its closed positioned. In the arrangement of FIG. 1, a peripheral portion of the diaphragm 111 is attached to the bonnet 116, while an inner portion of the diaphragm 111 is attached to the valve rod 109. Because the spring 115 preferably urges the valve rod 109 downwardly, the diaphragm 111 is urged against the valve seat 172. In other embodiments, the valve assembly may be biased in an open position. However, a valve assembly 100 which is biased in a closed position is preferred so that the diaphragm 111 does not accidentally open at the wrong time.

A magnetic member 104 is placed within the valve body 160. The magnetic member 104 is concentrically disposed around a portion of the upper shaft 108. The magnetic member 104 is fabricated from a magnetic material, such as iron, iron/cobalt alloys, iron/nickel alloys, or other suitable materials. A solenoid coil 102 is positioned in parallel with the shaft 108. The solenoid coil 102 may comprise one or a plurality of coils wrapped around the shaft 108. The solenoid coil 108 and the magnet 104 operate together to move the valve member 170 between its open and closed positions.

In operation, the piston 170' and its diaphragm 111 are moved from a closed position to an open position by supplying a current to the solenoid coil 102. Current is supplied through an electrical connector 101. The flow of current causes the solenoid coil 102 to be electromagnetically induced. The magnetic flux of the induced solenoid coil 102 causes relative movement between the coil 102 and the magnetic member 104. In one arrangement, the magnet 104 is mechanically attached to and moves with the shaft 108, while the position of the solenoid coil 102 is fixed relative to the valve body 160. In another arrangement, the magnet 104 is mechanically attached to the valve body 160, while the solenoid 102 is mechanically attached to the shaft 108. In either instance, the presence of magnetic flux moves the piston 107', e.g., the shaft 108 and the connected valve rod 109 and diaphragm 111.

As noted above, the diaphragm 111 may either be biased in an open or a closed position. Where the diaphragm 111 is normally open, actuation of the piston 170' may be by urging the magnet 104 and connected shaft 108 downward. This causes the diaphragm 111 to move downward and to seat. In this way, inlets 162 and 164 are closed. A lower shoulder 170c is fabricated along the piston 170' for mechanically engaging the magnet 104. Where the diaphragm 111 is normally closed, actuation of the valve member 170 may be by urging the solenoid 102 and connected shaft 108 upward. This causes the diaphragm 111 to move upward. As the diaphragm 111 is moved upward, it raises off of the valve seat 172. In this way, inlets 162 and 164 are selectively opened. An upper shoulder 173 is fabricated along the piston 170' for mechanically engaging an upper magnet 107. In this respect, optional magnetic members 105, 106, and/or 107 may be disposed about the solenoid coil 102 to increase the drive force of the magnetic flux of the solenoid coil 102. These additional magnets would be fixed to the coil 102.

While a mechanical engagement arrangement is shown in FIG. 1 for acting upon the piston 170', the present invention is not limited to mechanical engagement, but may include electromagnetic force, such as by fabricating the shoulder 173 from a magnetic material having opposite polarity from that of the magnet 107.

In order to actuate the valve member 170, and as noted above, current is provided to the solenoid coil 102. In one arrangement, current is provided by a driver 180. Electrical communication is provided between the valve member 170 and the solenoid coil 102 through an electrical connector 101. Signals are sent through the electrical connector 101 by a programmable logic controller (PLC) 182. The PLC 182, in turn, is controlled by a main controller 184. For example, the main controller 184 signals the programmable logic controller 182 to execute a set of operations. The programmable logic controller 182 signals the main controller 184 when the operations have been executed. The PLC 182 reduces the time required to transmit the set of operations between the main controller 184 and the driver 180. Preferably, the electrical connector 101 is disposed away from the valve body 160 to reduce the likelihood of disconnection of the electrical connector 101 and the driver 180 from the jarring motion of the shaft 108 and connected valve rod 109.

Returning to FIG. 1, the valve assembly 100 is in its open position. It can be seen that the diaphragm 111 is away from the valve seat 172 to allow the in-flow of a reactant from the reactant inlet 162 or the in-flow of a purge gas from the purge inlet 164. Gases are allowed to enter the valve chamber 161, where they flow out through the outlet 166. From there, gases flow into the substrate processing chamber body.

In a closed position, the diaphragm 111 is in contact with the valve seat 172 to prevent the in-flow of a reactant from the reactant inlet 162. In certain preferred embodiments, in its closed position the diaphragm 111 does not block the in-flow of the purge gas from the purge inlet 164, through the valve chamber 161, into the outlet 166, and out to the substrate processing chamber. As shown in FIG. 1, the valve chamber 161 may further comprise a groove 172' formed in the valve body 160 below the valve seat 172 so that the purge inlet 164 and the outlet 166 remain in fluid communication whether the diaphragm 111 is in a closed position or an open position. The groove 172' may be annular in shape as shown, or may be any suitable shape. As a consequence, in one aspect the three-port valve body 160 allows for a constant purge of the valve chamber 161. Those of skill in the art will then appreciate that there is less particle formation from residual materials remaining in the valve chamber 161 due to the continuous purge.

Preferably, the distance (i.e. the operating stroke) the valve rod 109 moves between a closed position and an open position is about 0.2 mm or less. This is shorter than the stroke length of 0.5 mm in known electronic valves. A short operating stroke reduces the impact force between the diaphragm 111 and the valve seat 172. As a consequence, a reduced impact force reduces the chance of degradation of the diaphragm 111 and the valve seat 172. In addition, a reduced impact force reduces the likelihood of deformation of the valve seat 172 and the resulting likelihood of leakage between the diaphragm 111 and the valve seat 172 in a closed position. Formation of particles along the seat 172 may also develop. Along with a reduced operating stroke, the flow coefficient of the valve assembly 100 preferably remains relatively high. In one preferred embodiment, the operating stroke of the valve rod 109 is about 0.2 mm or less and the Cv constant is between about 0.1 and about 0.13.

The biasing force of the spring 115 may be adjusted to reduce the force applied to the valve rod 109 when the diaphragm 111 moves from an open position to a closed position. Thus, the velocity of the valve rod 109 and the impact force between the diaphragm 111 and the valve seat 172 is reduced. In a countervailing consideration, the force of the spring 115 should be large enough to ensure an adequate seal between the diaphragm 111 and the valve seat 172 in a closed position. Preferably, the leakage across the diaphragm 111 and the valve seat 172 is about $1 \times 10^{-9}$ sccm or less when the seal is tested against vacuum to atmosphere.

The diaphragm 111 preferably comprises at least two separate diaphragm members. In FIG. 1, separate top 111a and bottom 111b diaphragms are shown. In one embodiment, the bottom diaphragm 111b is closest to the valve seat 172 and has a thickness that is at least 25% greater than the thickness of the top diaphragm 111a. By way of example, the top diaphragm 111a has a thickness of about 0.1 mm, while the bottom diaphragm 111b has a thickness of about 0.125 mm. It has been observed that a thicker bottom diaphragm 111b reduces the degradation thereof and thus, increases the lifetime of the valve assembly 100. Preferably, the lifetime of the valve assembly 100 is at least about $5 \times 10^6$ cycles or more.

The valve seat 172 is preferably fabricated as a separate piece from the valve body 160. Alternatively, the valve seat 172 may be an integral piece with the valve body 160. Whether a separate piece or an integral piece with the valve body 160, the valve seat 172 is preferably made of a chemically resistant material which does not react with the reactant provided through the reactant inlet 162. The valve seat 172 is preferably made of polychlorotrifluoroethylene (PCTFE) or polytetrafluoroethylene (PTFE) which have the qualities of being 1) hard enough to resist deformation from the impact by the diaphragm 111, 2) soft enough to reduce degradation of the diaphragm 111, and 3) resistant to reaction with reactants (i.e. $B_2H_6$, $TiCl_4$, $NH_3$, $WF_6$, and/or other reactants) at high temperatures (i.e. about 100° C. and higher). In less preferred embodiments, possible materials for the valve seat 172 include polyimide (PI), perfluoroalkoxy (PFA), other polymers, metals, and metal alloys. In certain embodiments, depending on the reactant provided therethough, the valve body 160 is heated to a temperature of about 90° C. or more, or even 120° C. or more, to prevent condensation of the reactant on the diaphragm 111 or other valve assembly 100 components during use.

The surface area of the valve seat 172 is preferably increased in order to disperse the impact force between the diaphragm 111 and the valve seat 172. Increasing the surface area of the valve seat 172 may include increasing the internal diameter and/or the width of the diaphragm 111.

Figure 2:
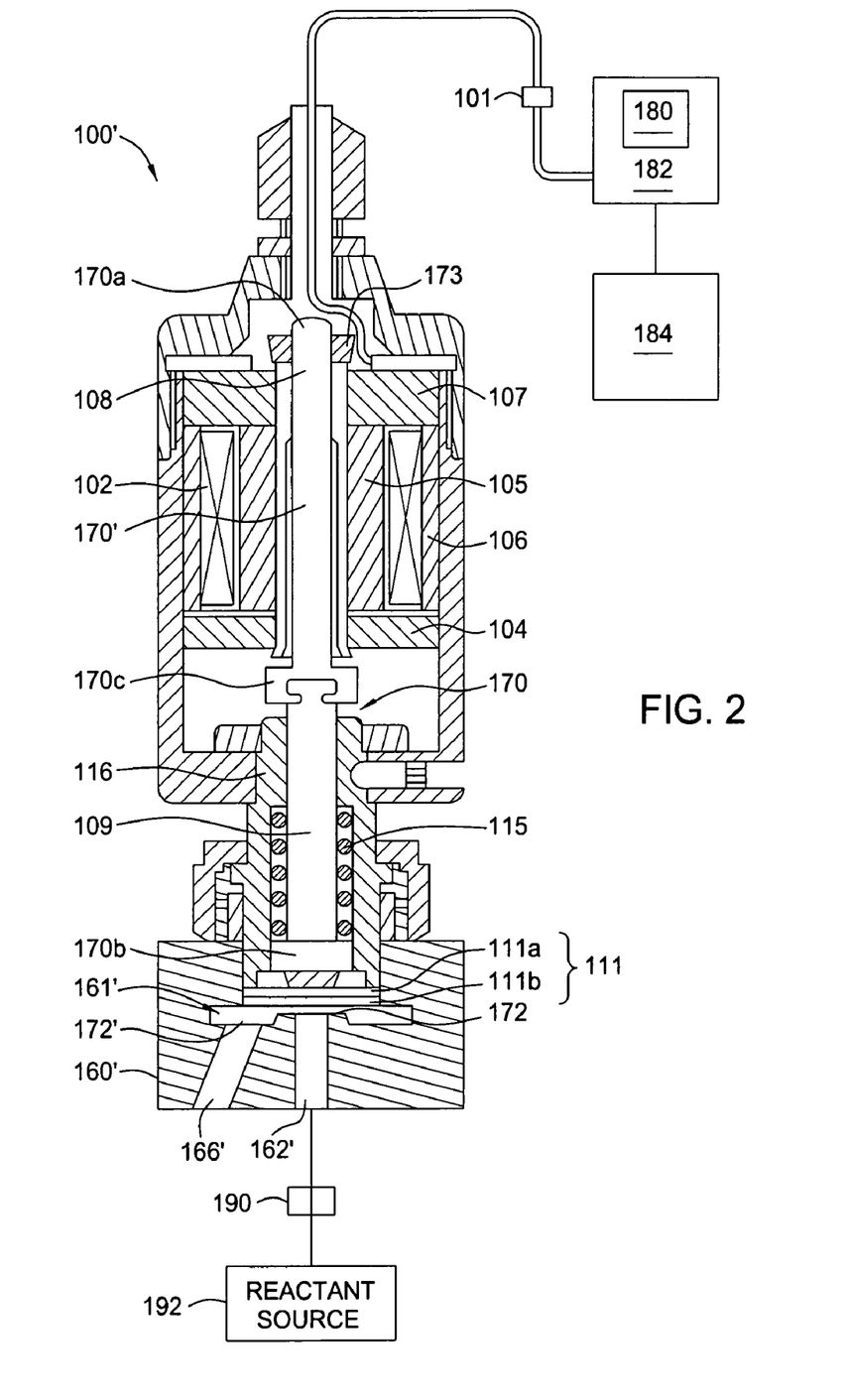
FIG. 2 presents a cross-sectional view of an electronically controlled valve assembly employing a two-port valve body.

Referring now to FIG. 2, FIG. 2 presents a cross-sectional view of one embodiment of an electronically controlled valve assembly 100'. In this alternate arrangement, the assembly 100' employs a two-port valve body 160' rather than the three-port body of FIG. 1. The electronically controlled valve assembly 100' comprising a two-port valve body 160' is similar to the valve assembly 100 including a three-port valve body 160 of FIG. 1. As a consequence, like numerals have been used where appropriate.

The two-port valve body 160' of the valve assembly 100' includes a valve chamber 161' in fluid communication with two ports—a reactant inlet 162' and an outlet 166'. In an open position, the diaphragm 111 is off of the valve seat 172 to allow the in-flow of a reactant from the reactant inlet 162'. The reactant gas flows into the valve chamber 161', through the outlet 166', and into the substrate processing chamber body as described with FIG. 1 above. In a closed position, the diaphragm 111 is in contact with the valve seat 172 to prevent the in-flow of a reactant from the reactant inlet 162'. The use of a two-port valve body 160' allows for a reduced amount of reactants to be used since the reactants are not diluted by a constant flow of purge gas in comparison to a three-port valve body.

Figure 3:
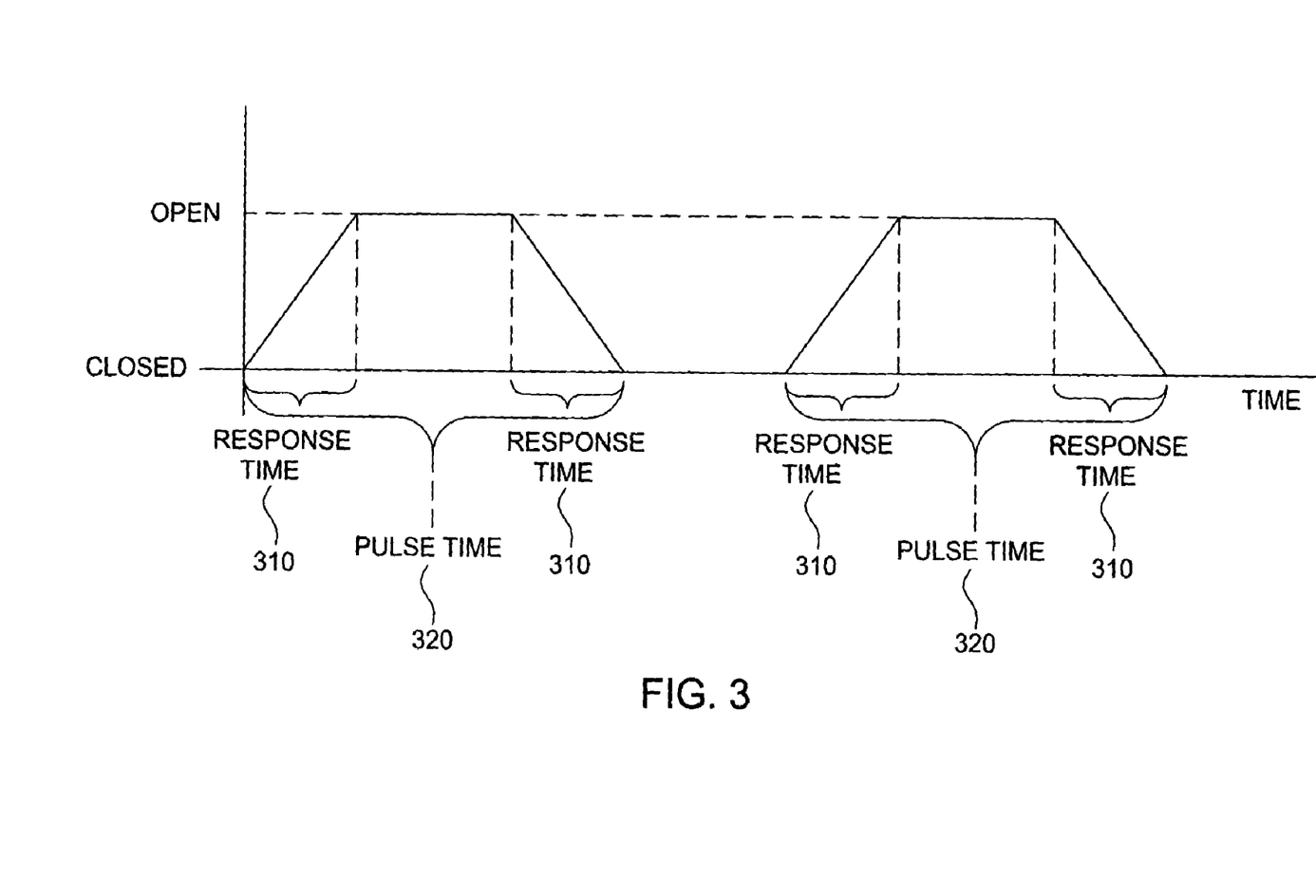
FIG. 3 provides a graph of the response time of the piston as it is moved between a closed position and an open position.

FIG. 3 is a graph of the response time 310 of the piston 170' when moved between its closed position and its open position. The term "response time" as used herein is defined as the time to move the piston 170' (and connected diaphragm 111) of the valve assembly 100 or 100' move from an open position to a closed position or from a closed position to an open position. The response time to move the piston 170' from an open position to a closed position, and the response time to move the piston 170' from a closed position to an open position may be the same or may be different, but are preferably approximately the same. Preferably, the valve assembly 100 has a response time of about 20 msec or less, and more preferably 5 msec or less.

Reducing the response time of a valve assembly 100 permits more cycles of pulses of reactants to be provided over time. Therefore, throughput of processing substrates is increased. However, the valve assembly 100 can be operated to any desired pulse time 320. The term "pulse time" as used herein is defined as the time to move the piston 170'/diaphragm 111 from a fully closed position to a fully open position and back to fully closed position. The valve assembly 100, 100' may be operated to provide pulse times of about 200 msec or less, about 100 msec or less, and even about 50 msec or less.

Figure 4:
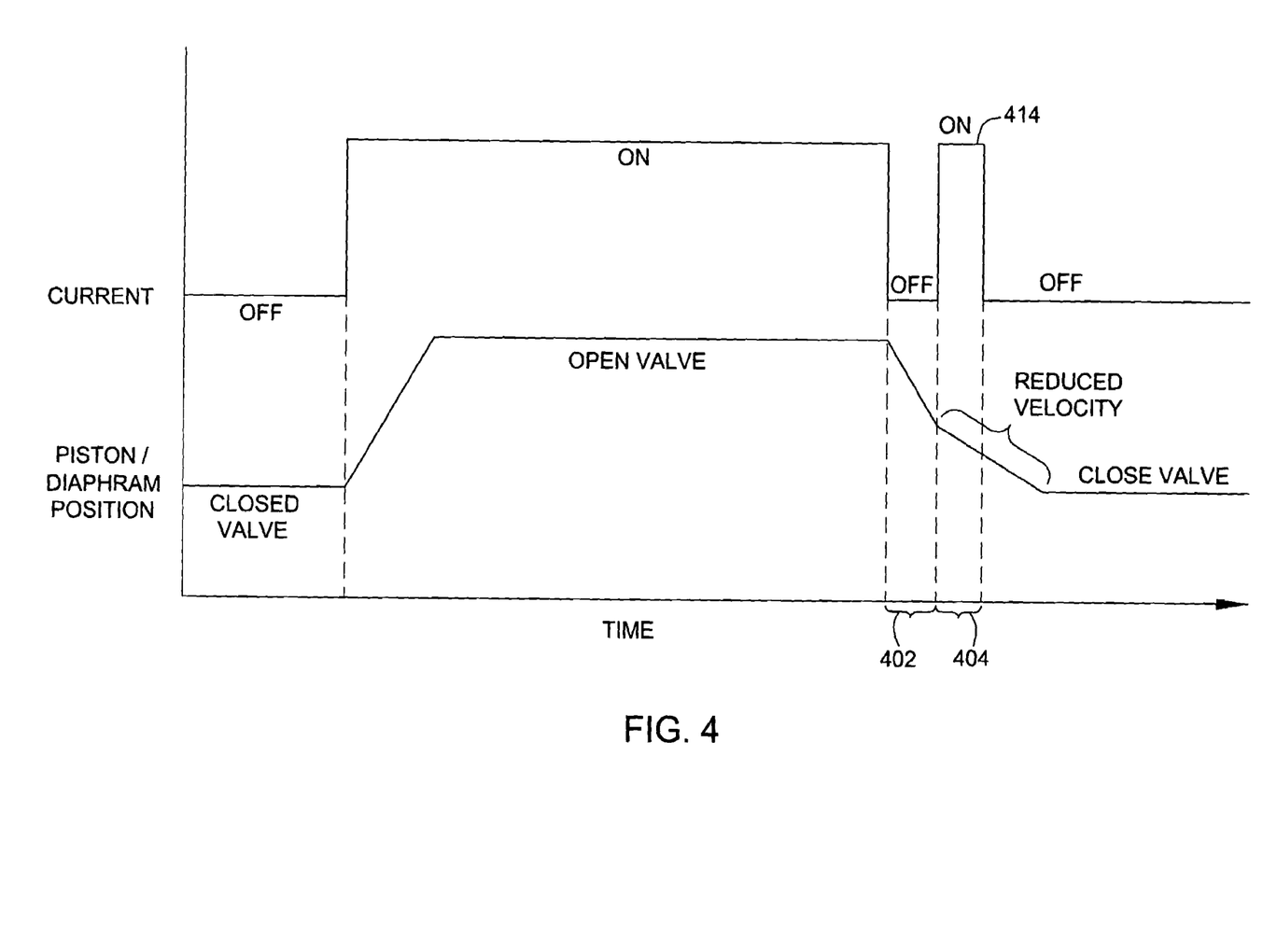
FIG. 4 is graph demonstrating current being delivered to the solenoid coil to act as a dynamic break of an electronically controlled valve assembly.

FIG. 4 provides a graph in which the PLC 182 is configured to control the driver 180. A comparison is made between the current level applied by the driver 180 and the position of the diaphragm 111. According to the graph, both the presence of current and the position of the diaphragm 111 are shown as a function of time.

In the arrangement shown in FIG. 4, the valve assembly 100 is biased in its closed position. This means that when no current is applied through the connector 101, the piston 170' is in its closed position. When current is delivered through the connector 101, the piston 170' moves to its open position. When the piston 170' is moved from an open position to a closed position, the current at time 402 is shut off to the solenoid coil 102 so that the spring 115 will move the diaphragm 111 towards the valve seat 172. Before the diaphragm 111 reaches the valve seat 172, a short pulse of current 414 is applied at time 404 to the solenoid coil 102 to reduce the velocity of the piston 170'. A reduction in the velocity of the piston 170' results in a reduced impact force of the diaphragm 111 against the valve seat 172. However, if too large a pulse of current is applied, the solenoid coil 102 will cause the diaphragm 111 to move away from the valve seat 172. Because the elastic force of the spring 115 does not stay constant over time, and because of the difficulty of timing a pulse of current for valves having a short response time, the pulse of current 414 is turned off prior to the diaphragm 111 contacting the valve seat 172. This ensures adequate sealing between the diaphragm 111 and the valve seat 172. Thus, a current 414 acts as a dynamic break of the diaphragm 111 of FIGS. 1 and 2.

The valve assembly 100, 100' may optionally include diaphragm position indicators to directly or indirectly determine the position of the diaphragm 111. This ensures that the diaphragm 111 is moving between an open position and a closed position so that no pulses of reactants or cycles are missed. In one embodiment, the current output of the driver 180 may be measured to determine if there is a short in the electrical connector 101 between the driver 180 and the solenoid coil 102. In another embodiment, a gauge 190 (seen in FIGS. 1 and 2) may measure the pressure in the gas line between the reactant source and the reactant inlet 162, 162'. The gauge 190 provides a way of determining whether pressure in the gas line is building up when the diaphragm 111 is in a closed position and whether the pressure in the gas line is being released when the diaphragm 111 is an open position. In still another embodiment, a mechanical amplifier may use mechanical means of determining the position of the diaphragm 111. In yet another embodiment, a sensor, such as a magnetic sensor or a laser, may be used to determine the position of diaphragm 111.

The valve assembly 100, 100' of FIGS. 1 and 2 may be used with any suitable substrate processing chamber to provide pulses of reactants thereto. Preferably, the valve assembly 100, 100' is surface-mounted to the chamber. Alternatively, the valve assembly 100, 100' may be coupled to the chamber through a gas line.

In one example, the valve assembly 100, 100' may be used with the chamber lid described in U.S. Patent Publication No. 2003/0116087 entitled "Chamber Hardware Design For Titanium Nitride Atomic Layer Deposition," filed on Dec. 21, 2001, which is incorporated by reference in its entirety to the extent not inconsistent with the present disclosure. The valve assembly 100, 100', may also be used with the chamber lid as described in U.S. Pat. No. 6,878,206 entitled "Lid Assembly For A Processing System To Facilitate Sequential Deposition Techniques," filed on Dec. 12, 2001, which claims priority to U.S. Provisional Application Ser. No. 60/305,970 filed on Jul. 16, 2001, which are both incorporated by reference in their entirety to the extent not inconsistent with the present disclosure. The valve assembly 100, 100' may also be used with the apparatus disclosed in U.S. Pat. No. 6,916,398 entitled "Gas Delivery Apparatus and Method for Atomic Layer Deposition," filed on Dec. 21, 2001, which claims benefit of U.S. Provisional Patent Application Ser. No. 60/346,086, entitled "Method and Apparatus for ALD Deposition," filed Oct. 26, 2001, which are both incorporated by reference in their entirety to the extent not inconsistent with the present disclosure. The valve assembly 100, 100' may also be used with other suitable chambers.

While the foregoing is directed to embodiments of the present invention, other and further embodiments of the invention may be devised without departing from the basic scope thereof, and the scope thereof is determined by the claims that follow.

The invention claimed is:

1. An electronically controlled valve assembly, comprising:
   a valve body having a valve seat, and at least two gas inlets and one gas outlet below the valve seat;
   a piston movable within the valve body above the valve seat between an open position and a closed position, the piston being configured to seal at least one of the at least two gas inlets when the piston is moved to the closed position;
   a solenoid coil for generating a magnetic field; and
   a magnetic member, the magnetic member and the solenoid coil moving relatively away from each other when the solenoid coil is electromagnetically induced, such relative movement moving the piston between the open and closed positions, wherein the gas outlet is in fluid communication with a substrate processing chamber.

2. The valve assembly of claim 1, wherein:
   the position of the solenoid coil is fixed relative to the piston; and
   the magnetic member mechanically acts against the piston to move the piston.

3. The valve assembly of claim 2, wherein the magnetic member is attached to the piston.

4. The valve assembly of claim 1, wherein:
   the position of the solenoid coil is fixed relative to the piston; and
   the magnetic member magnetically acts against the piston to move the piston.

5. The valve assembly of claim 1, wherein:
   the position of the magnetic member is fixed relative to the piston; and
   the solenoid coil mechanically acts against the piston to move the piston.

6. The valve assembly of claim 5, wherein the solenoid coil is attached to the piston.

7. The valve assembly of claim 1, wherein:
   the position of the magnetic member is fixed relative to the piston; and
   the solenoid coil magnetically acts against the piston to move the piston.

8. The valve assembly of claim 1, wherein the at least two gas inlets include a reactant inlet and a purge gas inlet.

9. The valve assembly of claim 8, wherein the valve seat is configured to permit fluid communication between the purge gas inlet and the at least one outlet even when the piston is in the closed position.

10. The valve assembly of claim 1, wherein the piston comprises an elongated shaft, and a diaphragm at an end of the shaft for sealing against the at least one gas inlet when the piston is in the closed position.

11. The valve assembly of claim 10, wherein:
    the piston further comprises an upper shaft, and a lower valve rod coupled to the upper shaft; and
    the diaphragm is disposed at an end of the valve rod opposite the upper shaft.

12. The valve assembly of claim 10, wherein the diaphragm comprises:
    an upper diaphragm member coupled to the shaft; and
    a lower diaphragm member for sealing against the at least one gas inlet when the piston is in the closed position.

13. The valve assembly of claim 12, wherein the lower diaphragm has a thickness at least approximately 25% greater than a thickness of the upper diaphragm.

14. The valve assembly of claim 1, wherein the piston has a stroke length of about 0.2 mm.

15. The valve assembly of claim 1, wherein the valve seat is fabricated from a material selected from the group including PCTFE, PTFE, and combinations thereof.

16. The valve assembly of claim 11, further comprising a diaphragm position indicator.

17. The valve assembly of claim 1, wherein the solenoid coil is magnetically induced when it receives current through a control line.

18. The valve assembly of claim 1, wherein current is generated to the solenoid coil by a power driver.

19. The valve assembly of claim 18, wherein the power driver delivers current to the solenoid coil in response to signals from a programmable logic controller.

20. The valve assembly of claim 19, wherein the programmable logic controller is controlled by a main controller.

21. An electronically controlled valve assembly, comprising:
    a valve body having a valve seat, and a gas inlet and a gas outlet below the valve seat, the gas inlet being in fluid communication with a reactant source and a purge gas source, and the gas outlet being in fluid communication with a substrate processing chamber;
    a piston movable within the valve body above the valve seat between an open position and a closed position;
    a diaphragm disposed at an end of the piston, the diaphragm being configured to seal the at least one gas inlet when the piston is moved to the closed position;
    a biasing spring acting on the piston and connected diaphragm;
    a solenoid coil for generating a magnetic field; and
    a magnetic member, the magnetic member and the solenoid coil moving relatively away from each other when the solenoid coil is electromagnetically induced, such relative movement selectively moving the piston between the open and closed positions.

22. The valve assembly of claim 21, wherein the piston and connected diaphragm are biased by the spring in the closed position.

23. The valve assembly of claim 21, wherein:
    the position of the solenoid coil is fixed relative to the piston; and
    the magnetic member mechanically acts against the piston to move the piston.

24. The valve assembly of claim 21, wherein the piston and connected diaphragm are biased by the spring in the open position.

25. The valve assembly of claim 21, wherein the piston has a stroke length of about 0.2 mm.

26. A method of injecting a reactant into a substrate processing chamber, comprising the steps of:
    placing a reactant gas source in fluid communication with an electronically controlled valve assembly, the valve assembly comprising:
    a valve body having a valve seat, a reactant inlet, a purge gas inlet, and a gas outlet,
    a piston movable within the valve body above the valve seat between an open position and a closed position, the piston being configured to seal the reactant inlet when the piston is moved to the closed position, a solenoid coil for generating a magnetic field, and a magnetic member, the magnetic member and the solenoid coil moving relatively away from each other when the solenoid coil is electromagnetically induced, such relative movement selectively moving the piston between the open and closed positions; and directing a current to the solenoid coil to magnetically induce the coil, causing the piston to move relative to the valve seat.

27. The method of claim 26, wherein the step of directing a current to the solenoid coil causes the piston to move off of the valve seat, allowing one or both of a reactant gas or a purge gas to move through the valve seat and the gas outlet.

28. The method of claim 26, wherein the step of directing a current to the solenoid coil causes the piston to move onto the valve seat, preventing one or both of a reactant gas or a purge gas from flowing through the valve seat and the gas outlet.

29. The method of claim 26, further comprising the step of:

discontinuing the directing of current to the solenoid coil, causing the piston to seal against the valve seat, and preventing one of a reactant gas or a purge gas from flowing through the valve seat and the gas outlet.

30. The method of claim 26, wherein:

the position of the solenoid coil is fixed relative to the valve body; and the magnetic member mechanically acts against the piston to move the piston.

31. The method of claim 30, wherein the magnetic member is attached to the piston.

32. The method of claim 26, wherein:

the position of the solenoid coil is fixed relative to the valve body; and the magnetic member magnetically acts against the piston to move the piston.

33. The method of claim 26, wherein:

the position of the magnetic member is fixed relative to the valve body; and the solenoid coil mechanically acts against the piston to move the piston.

34. The method of claim 33, wherein the solenoid coil is attached to the piston.

35. The method of claim 26, wherein:

the position of the magnetic member is fixed relative to the valve body; and the solenoid coil magnetically acts against the piston to move the piston.

36. The method of claim 26, wherein:

the piston further comprises an upper shaft and a lower valve rod coupled to the upper shaft; and a diaphragm is disposed at an end of the valve rod opposite the upper shaft.

37. The method of claim 36, wherein the diaphragm comprises:

an upper diaphragm member coupled to the shaft; and a lower diaphragm member for sealing against the at least one gas inlet when the piston is in the closed position.

38. The method of claim 37, wherein the lower diaphragm has a thickness at least approximately 25% greater than a thickness of the upper diaphragm.

39. The method of claim 37, wherein the piston has a stroke length of about 0.2 mm.

40. The method of claim 37, wherein the valve seat is fabricated from a material selected from the group including PCTFE, PTFE, and combinations thereof.

* * * * *